United States Patent
Le Perchec et al.

(10) Patent No.: US 12,510,471 B2
(45) Date of Patent: Dec. 30, 2025

(54) DEVICE FOR OBSERVING A SAMPLE BY IMAGING

(71) Applicant: COMMISSARIAT A L'ENERGIE ATOMIQUE ET AUX ENERGIES ALTERNATIVES, Paris (FR)

(72) Inventors: Jérôme Le Perchec, Grenoble (FR); Mathieu Dupoy, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 115 days.

(21) Appl. No.: 18/398,312

(22) Filed: Dec. 28, 2023

(65) Prior Publication Data

US 2024/0219300 A1 Jul. 4, 2024

(30) Foreign Application Priority Data

Dec. 28, 2022 (FR) ..................................... 22 14572

(51) Int. Cl.
  *G01N 21/35* (2014.01)
  *H04N 23/55* (2023.01)
(52) U.S. Cl.
  CPC ............. *G01N 21/35* (2013.01); *H04N 23/55* (2023.01)
(58) Field of Classification Search
  None
  See application file for complete search history.

(56) References Cited

U.S. PATENT DOCUMENTS

| 6,650,472 | B1 | 11/2003 | Adachi et al. |
| 9,075,225 | B2 * | 7/2015 | Fine ................... G01N 21/6408 |
| 2004/0051945 | A1 | 3/2004 | Adachi et al. |
| 2004/0057110 | A1 | 3/2004 | Adachi et al. |
| 2006/0017860 | A1 | 1/2006 | Adachi et al. |
| 2007/0133090 | A1 | 6/2007 | Adachi et al. |

(Continued)

FOREIGN PATENT DOCUMENTS

| CN | 108333790 A | 7/2018 |
| DE | 196 24 421 A1 | 1/1997 |
| EP | 3 722 861 A1 | 10/2020 |

OTHER PUBLICATIONS

French Preliminary Search Report and Written Opinion issued Jul. 24, 2023 in French Application 22 14572 filed on Dec. 28, 2022, 10 pages (with English Translation of Categories of Cited Documents).

*Primary Examiner* — Marcus H Taningco
(74) *Attorney, Agent, or Firm* — Oblon, McClelland, Maier & Neustadt, L.L.P.

(57) ABSTRACT

A device for observing a sample includes a light source; an image sensor, comprising several pixels; and a microlens array comprising several convergent microlenses, each: microlens being disposed facing a pixel, each microlens comprising an image focus, each microlens being configured to form, from light waves being propagated in parallel incidence, a light wave beam converging towards the image focus of said microlens. The device is configured to hold the sample between the light source and the plurality of microlenses. The device includes several attenuating elements each attenuating element being associated with a microlens and with a pixel, each attenuating element being configured to attenuate the light waves converging towards the image focus of the lens with which it is associated.

11 Claims, 5 Drawing Sheets

(56) References Cited

U.S. PATENT DOCUMENTS

| | | |
|---|---|---|
| 2013/0084598 A1 | 4/2013 | Moy et al. |
| 2016/0153903 A1* | 6/2016 | Ono .................... G01N 21/59 356/432 |
| 2017/0003202 A1* | 1/2017 | Pouteau ............ G01N 33/48785 |
| 2021/0262927 A1 | 8/2021 | Coutard et al. |
| 2022/0178820 A1 | 6/2022 | Coutard et al. |

* cited by examiner

DEVICE FOR OBSERVING A SAMPLE BY IMAGING

TECHNICAL FIELD

The invention relates to a device for observing a sample by strioscopy.

PRIOR ART

The observation of biological samples can be confronted with a difficulty linked to the transparent nature of certain biological objects, for example cells, cellular structures or microorganisms. In order to address this problem, strioscopy imaging techniques can be implemented, aiming to black out light rays emitted by the light source. A so-called dark field, or phase contrast, image is thus formed. An example of implementation is described in EP2556164B1.

In the infrared domain, the U.S. Pat. No. 11,313,792 describes a lensless imaging device and method, in which a plate of a sample is exposed to an infrared radiation. The inventors propose a device that allows an observation of an essentially transparent sample, that is to say one comprising a large number of transparent particles.

SUMMARY OF THE INVENTION

A first subject of the invention is a device for observing a sample, comprising
- a light source, configured to emit a light wave in a direction of propagation, according to an emission wavelength;
- an image sensor, comprising several pixels;
- a plurality of convergent microlenses, each microlens being disposed facing a pixel, each microlens comprising an image focus, each microlens being configured to form, from light waves from the light source and being propagated parallel to the direction of propagation, a light wave beam converging towards the image focus of said microlens;
- the device being configured to hold the sample between the light source and the matrix of microlenses;
- wherein the device comprises several attenuating elements, each attenuating element being associated with a microlens and with a pixel, each attenuating element being configured to attenuate the light waves converging towards the image focus of the lens with which it is associated, and in that:
- each attenuating element is:
  - either a mask that is opaque to the emission wavelength;
  - or a phase-shifting element, formed from a transparent material arranged to induce a phase-shift, the phase-shift being determined with respect to a light wave being propagated in the absence of the attenuating element;
- each attenuating element extends between the microlens and the pixel with which it is associated;
such that each attenuating element attenuates each light wave being propagated to or from the image focus of a microlens.

According to a preferred embodiment:
- the pixels are coplanar, and distributed according to a detection plane;
- the respective image focuses of each microlens are coplanar, and form a focal plane, parallel to the detection plane;
- the attenuating elements extend in the focal plane or in a plane parallel to the focal plane.

The attenuating elements can notably extend in a plane parallel to the focal plane, said parallel plane being disposed at a distance less than 1 mm from the focal plane.

According to one possibility:
- the pixels are coplanar, and distributed according to a detection plane;
- each attenuating element extends, parallel to the detection plane, with a diagonal or a greater diameter less than two times the emission wavelength.

According to one embodiment, each attenuating element is a mask that is opaque to the emission wavelength.

According to one embodiment:
- each attenuating element is a phase-shifting element;
- the phase-shift created by each phase-shifting element is a quarter of the emission wavelength, or an odd multiple of the quarter of the emission wavelength.

According to one embodiment:
- each attenuating element is a phase-shifting element;
- each attenuating element is formed by an inclusion of a first material in or on a support layer formed by a second material.

Each attenuating element can be secured to a support layer, the support layer being secured to the plurality of microlenses or disposed at a distance from the plurality of microlenses.

Each attenuating element can be secured to the image sensor.

The emission wavelength can lie between 800 nm and 15 µm.

The distance between the sample and the plurality of microlenses can be less than 1 mm or than 500 µm.

The distance between the plurality of microlenses and the image sensor can be less than 1 mm or than 500 µm.

The distance between the sample and the image sensor can be less than 1 mm.

Another subject of the invention is a method for observing a sample using a device according to the first subject of the invention. The sample is disposed between the microlenses and the light source. The sample can comprise transparent particles, for example biological particles.

The invention will be better understood on reading the explanation of the exemplary embodiments presented, hereinafter in the description, in association with the figures listed hereinbelow.

FIGURES

EXPLANATION OF PARTICULAR EMBODIMENTS

Figure 1A:
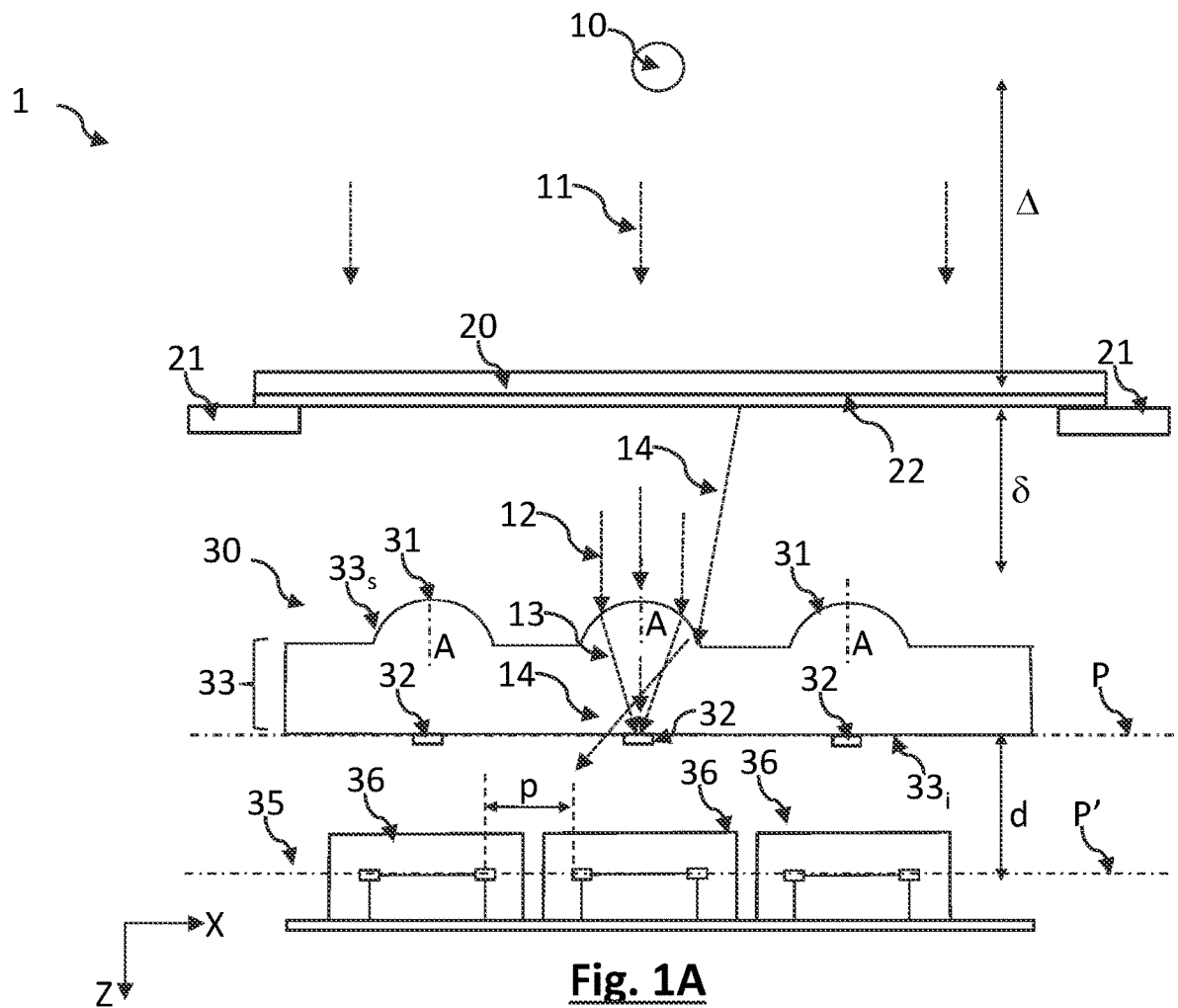
FIG. 1A represents a first embodiment of the invention.

FIG. 1A shows a first embodiment of a device 1 according to the invention. A light source 10, preferably monochromatic, or that can be considered as such, produces a light wave 11 being propagated parallel to an axis of propagation Z. The light source can notably be a laser. In the example represented, the light wave is emitted according to an infrared emission wavelength, for example lying between 800 nm and 15 µm. However, the invention can not be limited to the infrared spectral domain and can be implemented in the visible or ultraviolet spectral domain.

The device is intended for the observation of a sample 20. The sample 20 is held on a holding element 21. In this example, the sample 20 is a biological sample that is wanted to be characterized. The sample is deposited on a transparent plate 22 serving as sample support. A fine thickness is understood to mean a thickness preferably less than 100 µm, and preferably less than 10 µm, typically a few micrometres. The sample preferably extends at right angles or substantially at right angles to the axis of propagation Z. The term substantially at right angles means at right angles, but accepting an angular tolerance of a few degrees, preferably less than 10° or 5° or 1°.

The sample can comprise transparent particles, of which a spatial distribution in the sample is wanted to be evaluated. They can for example be biological particles, such as cells, for example of white globule type, or microorganisms. The sample can be liquid, in which case the transparent plate 22 forms the bottom of a fluidic chamber.

Preferably, the sample does not include coloured or fluorescent marking agents, intended to be fixed onto a predetermined type of particle. The observation of the sample is thus non-destructive.

The plate 22 is transparent with respect to the incident light wave 11. When the emission wavelength is situated in the infrared, the plate 22 can comprise or be composed of materials such as silicon, germanium, calcium fluoride ($CaF_2$), barium fluoride ($BaF_2$). Preferably, the transparent plate 22 comprises an antireflection coating.

The sample is essentially transparent, or translucent, with respect to the incident light wave. The expression "essentially transparent" is understood to mean that the sample absorbs only a small part of the incident light wave 11. The sample comprises microscopic objects of cell or microorganism type which diffuse or diffract the incident light wave 11, which forms a deflected light wave 14. The absorption of the incident light wave 11 by the sample is low, typically less than 50%, even than 10%. The main effect of the sample on the incident light wave is a deflection, by diffusion, or a phase-shift. The phase-shift is induced by a variation of the refractive index of the microscopic objects with respect to the remainder of the sample, as well as by the thickness of said microscopic objects.

In FIG. 1A, a light wave 12 transmitted by the sample has been represented, as well as a light wave 14 resulting from the diffusion and/or from the refraction of the incident light wave 11 by particles contained in the sample. A "transmitted light wave" is understood to be a light wave being propagated, downstream of the sample, in the same direction of propagation as upstream of the sample, in this case along the axis Z.

The distance A between the light source and the sample, on the axis Z, is preferably greater than 1 cm. It preferably lies between 2 and 30 cm. Preferably, the light originates from the sample in the form of planar waves, or waves that can be considered as such.

The light source 10 is preferably a laser source. It can notably be a wavelength-tunable laser source, for example a QCL laser, QCL being the acronym for Quantum Cascade Laser, in particular a laser with external cavity. The width of the emission spectral band of the light source is preferably less than 50 nm, even than 10 nm, even than 5 nm. A light source can comprise several elementary QCL laser sources respectively emitting in different spectral bands.

The device comprises an array 30 of microlenses, comprising several convergent lenses 31. In this example, the array 30 is a matrix of microlenses 31 arranged regularly. In the example represented in FIG. 1A, each lens is delimited by a hemispherical outer surface 33. The term microlens designates a lens whose diameter or greatest diagonal is less than 1 mm, even than 100 µm. Normally, the diameter or the diagonal of each microlens measures a few tens of µm.

The device comprises an image sensor 35, comprising pixels 36. According to the direction of propagation of the light wave emitted by the light source, each pixel is aligned with respect to a convergent microlens 31. Thus, each pixel 36 is associated with the microlens 31 with which it is aligned. In this example, the image sensor 35 is formed by a matrix of bolometers, each bolometer of the matrix having a detection spectral band in the infrared. Each bolometer forms a pixel 36. In the examples described hereinbelow, each pixel is formed by a bolometer encapsulated in a vacuum. Preferably, the light source 11 is configured such that the sample is lit by a light beam that is relatively homogeneous in intensity over the width of the analysed sample (i.e the size of the matrix of pixels).

According to a variant, the image sensor 35 can be a matrix of CMOS pixels, when the emission wavelength is situated in the visible domain. It can also be a matrix of cooled infrared pixels, created from HgCdTe or from the InGaAs semiconductors or the III-V semiconductors.

Whatever the image sensor, the pitch p between two adjacent pixels is preferably less than 100 µm, even than 500 µm. It can be of the order of a few tens of µm or 1 µm.

Each microlens 31 defines an image focus and an optical axis A. The optical axis A of each microlens is parallel to the axis of propagation Z of the light wave 11. Under the effect of an exposure to the light wave 12 transmitted by the sample, being propagated parallel to the axis of propagation Z, each microlens focuses the light wave 12 towards its image focus. The focusing forms a convergent wave 13 defining a light cone, the convergence tip of which corresponds to the image focus of the microlens 31.

The device 1 comprises, at each image focus, an attenuating element 32. The expression "at each image focus" is understood to mean that the attenuating element is disposed either on the image focus, or upstream or downstream of the image focus, the distance between the attenuating element 32 and the image focus being small, typically less than 1 mm, even less than 500 µm or than 100 µm. Each attenuating element 32 is intended to block or attenuate the light 13 being propagated to or from the image focus of each microlens.

Preferably, the attenuating elements 32 are coplanar, and belong to a same focal plane P. The focal plane P is preferably at right angles (or substantially at right angles) to the axis of propagation Z. In the focal plane P, the dimension of each attenuating element 32 corresponds to the dimension of the light cone 13 formed by each microlens 31. Note that each mask can be slightly offset with respect to the focal plane, subject to masking the convergent light wave 13 formed by each microlens 31. The dimension of each attenuating element is, for example, less than 2 or 3 times the emission wavelength. It is preferably less than or equal to the emission wavelength.

In the example represented in FIG. 1A, each attenuating element 32 is a mask that is opaque to the emission wavelength. Each mask can be formed by a metal of titanium or TiN (titanium nitride) or gold type. The thickness of each mask can lie between a few tens of nm and a few µm.

The function of the mask 32 is to absorb the light emitted by the light source then transmitted by the sample before being focused by a microlens. Thus, the light that has not interacted in the sample is blocked. The image formed by the image sensor is an image acquired in a dark background. The rays 14 diffused by the sample and then refracted by a microlens are propagated outside the attenuating elements 32 and reach the image sensor 35. Thus, the image formed by the image sensor corresponds to the light waves 14 deflected and possibly phase-shifted by the sample 20, according to the principles of strioscopy. The image formed by the image sensor comprises light dots, each light dot corresponding to a diffusing particle of the sample.

In the example represented in FIG. 1A, the matrix 30 of microlenses is a matrix of SIL (Solid Immersion Lens) type: each microlens 31 is disposed in contact with a transparent support plate 33. The support plate 33 extends between each microlens 31 and a bottom face $33_i$. The bottom face $33_i$ comprises the focal plane P of each microlens. The masks 32 are disposed on the bottom face $33_i$ of the support plate 33.

The bottom face $33_i$ of the support plate 33 can be covered by an antireflection layer. The masks are either deposited on the antireflection layer, or incorporated therein.

The masks 32 can be deposited, on the bottom face $33_i$, by photolithography or by printing.

The pixels 36 of the image sensor 35 are preferably aligned on a detection plane P'. The detection plane P' is parallel or substantially parallel to the focal plane P. Substantially parallel is understood to mean parallel to within an angular tolerance, less than 10°, preferably 5° or 1°.

The distance δ between the sample 20 and the lens matrix 30 is preferably less than 1 cm, and preferably less than 1 mm or than 500 µm. The distance d between the matrix of microlenses 30 and the image sensor 35 is preferably less than 1 mm or than 500 µm. According to one possibility, the attenuating elements 32 are in contact with the image sensor 35, by being disposed at the interface between the image sensor 35 and the matrix of microlenses 30.

Whatever the embodiment, it is preferable for the sample 20 to be disposed as close as possible to the image sensor. However, it is advantageous to keep a non-zero distance δ, so as to avoid a transmission of evanescent waves at the upstream outer surface $33_s$ from the matrix of microlenses. The expression "upstream outer surface" is understood to mean the surface of the microlenses closest to the sample 20.

The upstream outer surface 33 is structured to allow a focusing of the light wave 12 transmitted by the sample, being propagated parallel to the axis of propagation Z. In the example represented in FIG. 1A, the upstream outer surface $33_s$ comprises curved parts, for example hemispherical, forming convergent microlenses. According to another embodiment, represented in FIG. 2, the upstream outer surface $33_s$ is microstructured, so as to form convergent microlenses.

Figure 1B:
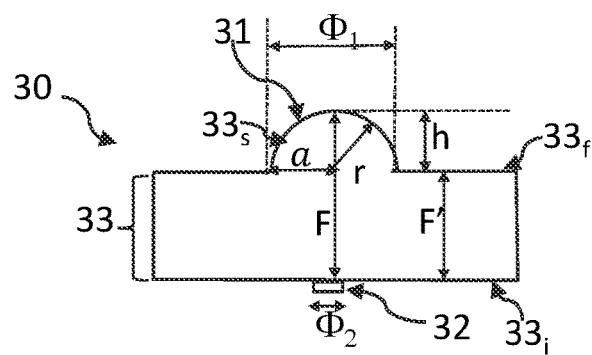
FIG. 1B shows a detail of the example represented in FIG. 1A.

FIG. 1B shows an example of dimensioning of a matrix of microlenses. The maximum thickness F' of the support plate 33, measured on the axis Z between the top of the microlenses and the bottom face $33_i$, corresponds to the focal distance of each microlens 31. The radius of curvature of each microlens 31 is designated r. The thickness of each microlens is designated h and is measured on the axis Z between its top and a planar zone $33_f$ of the top face $33_s$ of the support plate. The half-width of the each microlens on the axis X is designated a.

$$r = \frac{h^2 + a^2}{2h} \qquad (1)$$

When the microlens is hemispherical, h=a and r=a.

The minimum thickness F of the support plate 33 corresponds to the thickness of the plate between the planar zone $33_f$ of the top face $33_s$ of the support plate and the bottom face $33_i$ of the support plate, measured on the axis Z. If the index of the material forming the microlens is n, and if the index of the outside medium is equal to 1 (the outside medium being air), then $$F = \frac{nr}{n-1} \text{ and} \qquad (2)$$

$$F' = F - h \qquad (3)$$

The diameter $\Phi_2$ of each mask 32, in the focal plane, corresponds to the diameter of an Airy spot, which corresponds to the main diffraction spot.

$$\Phi_2 = \frac{2.44 \lambda F}{n \times \Phi_1} \qquad (4)$$

in which
$\Phi_1$ is the diameter of the microlens and λ is the emission wavelength.

When the microlens is hemispherical, r=a=h and $\Phi_1$=2a=2r $$\Phi_2 = \frac{1.22\lambda}{n-1} \qquad (5)$$

If the pitch p between two adjacent pixels is 35 µm, by considering microlenses made of silicon (n=3.4), and h=5 µm, a=15 µm, $\Phi_1$=30 µm, the implementation of the preceding equations leads to: r=25 µm, F'=35 µm, F=30 µm.

By considering λ=5 µm, $\Phi_2$=4.2 µm is obtained. By considering λ=10 µm, $\Phi_2$=8.4 µm is obtained. Thus, the diameter of each attenuating element 32 is of the order of magnitude of the wavelength, by being preferably less than the latter.

By taking into account a hemispherical form of the microlenses (h=a=15 µm), F=21 µm and $\Phi_2$=2.54 µm (λ=5 µm) or $\Phi_2$=5.08 µm (λ=10 µm).

Figure 2:
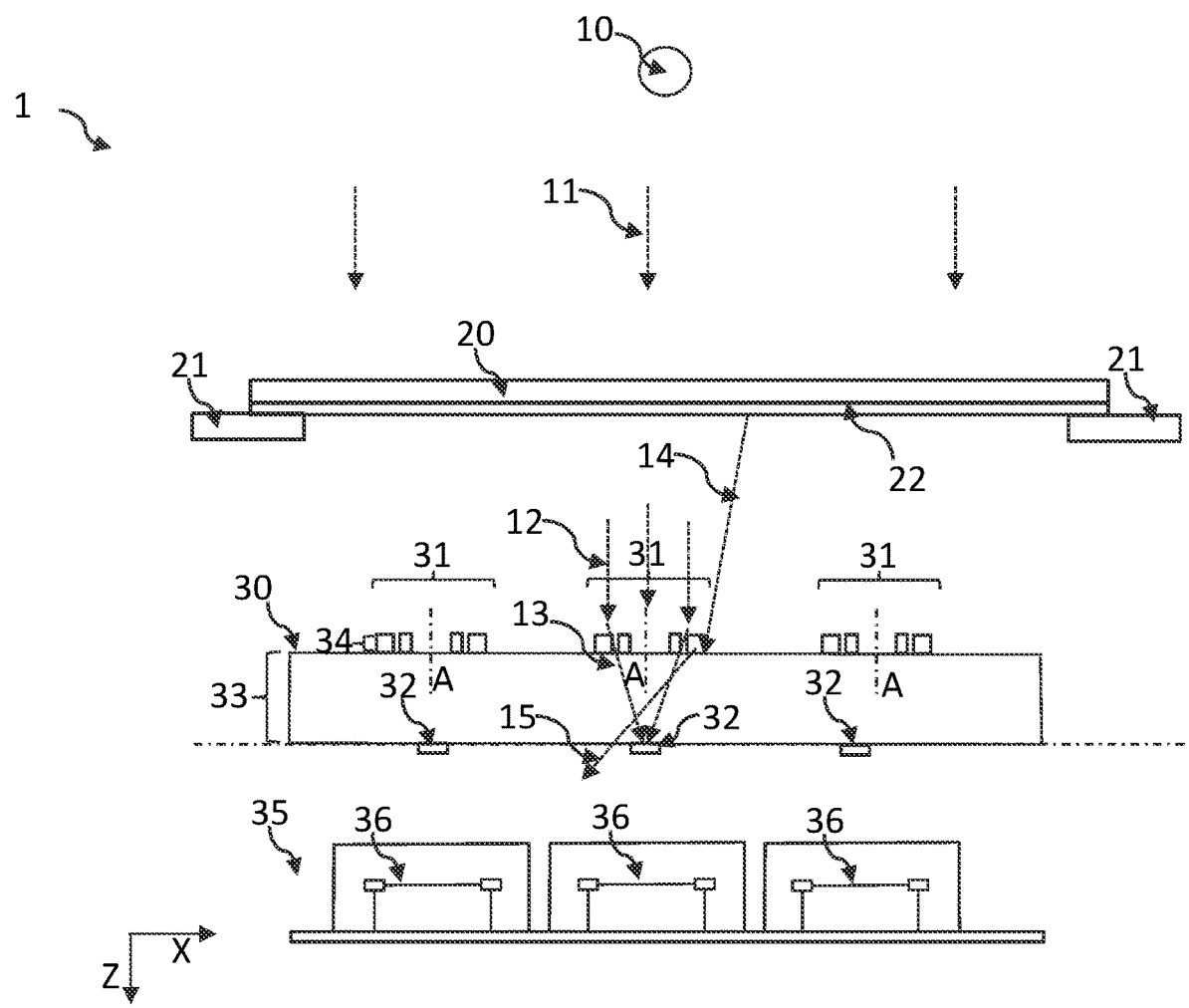
FIG. 2 shows a second embodiment of the invention.

FIG. 2 shows a configuration according to which each microlens 31 has a micro-structured surface to allow a focusing, towards an image focal point, of the light wave 12 being propagated, upstream of the lens, parallel to the axis of propagation Z. The lens 31 is then formed by a layer 34 comprising an alternation of materials exhibiting different refractive indices. According to the possibility represented in FIG. 2, the layer 34 comprises a microstructure forming a discretised Fresnel lens, that is symmetrical with respect to the optical axis A. Other types of diffraction arrays can be envisaged, such arrays being formed by a periodic alternation of materials exhibiting different refractive indices.

Figure 3:
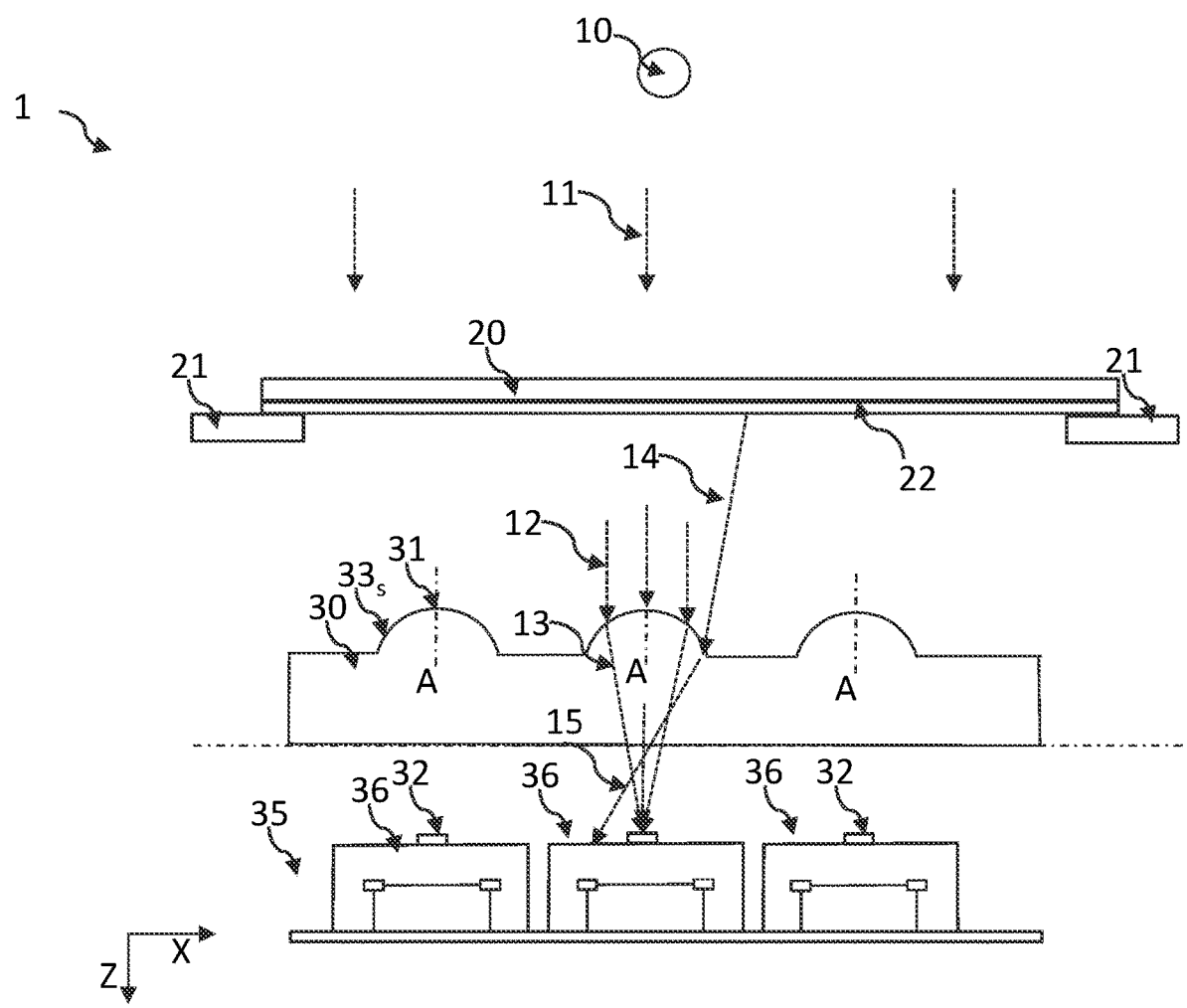
FIG. 3 shows a third embodiment of the invention.

FIG. 3 represents an embodiment in which the attenuating elements 32 are disposed on each pixel, by being preferably centred with respect to the optical axis A of a microlens 31 and with respect to a pixel 36.

According to a variant, the attenuating elements are disposed on a support, distinct from the matrix 30 of microlenses 31 and from the image sensor 35. The distance between the attenuating elements and the image sensor can be adjustable.

Figure 4:
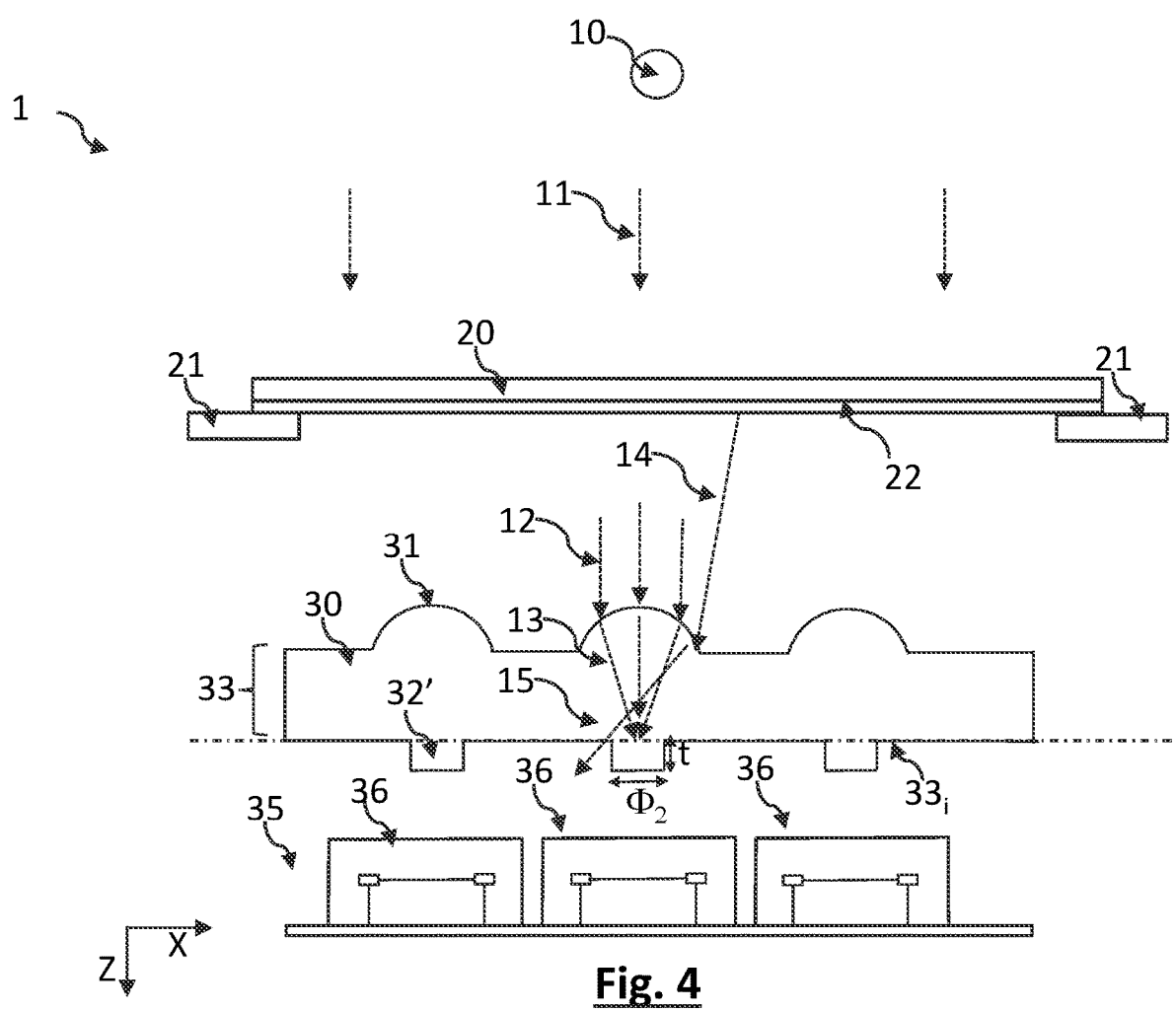
FIG. 4 shows a fourth embodiment of the invention.

In the examples represented in FIGS. 1A, 1B, 2 and 3, each attenuating element is an opaque mask. In FIG. 4, an embodiment has been represented in which each attenuating element 32' is transparent and is configured to produce a phase-shift. The phase-shift is preferentially $$\frac{\pi}{2} \text{ (or } k\frac{\pi}{2},$$

k being an odd integer) of a light wave passing through it, in a way similar to a quarter-wave plate. Each attenuating element 32' is a phase-shifting element. If n' is the refractive index of an attenuating element 32', the thickness t of the attenuating element, on the axis of propagation Z, is such that:

$$t = \frac{\lambda}{4(n' - n_{ext})} \text{ with } n' > n_{ext} \qquad (6)$$

in which $n_{ext}$ is the refractive index of the medium outside the attenuating element 32'.

For example, if each attenuating element 32' is formed by the same material as the support plate 33 and the microlenses 31, for example silicon (n=n'=3.4), t=520 nm.

According to this embodiment, the convergent wave 13 refracted by each microlens 31 is phase-shifted by $$\frac{\pi}{2}.$$

In this embodiment, the phrase defects introduced by the sample are reflected by relative variations of the lighting of the image sensor. These variations are also sensitive to the sign of the phase-shift of the light by the sample. This embodiment allows for an image contrast that is enhanced by comparison to the first embodiment.

On the configuration represented in FIG. 4, each face-shifting element 32 is obtained by the addition of material on the bottom face 33$_i$ of the support plate 33.

Figure 5:
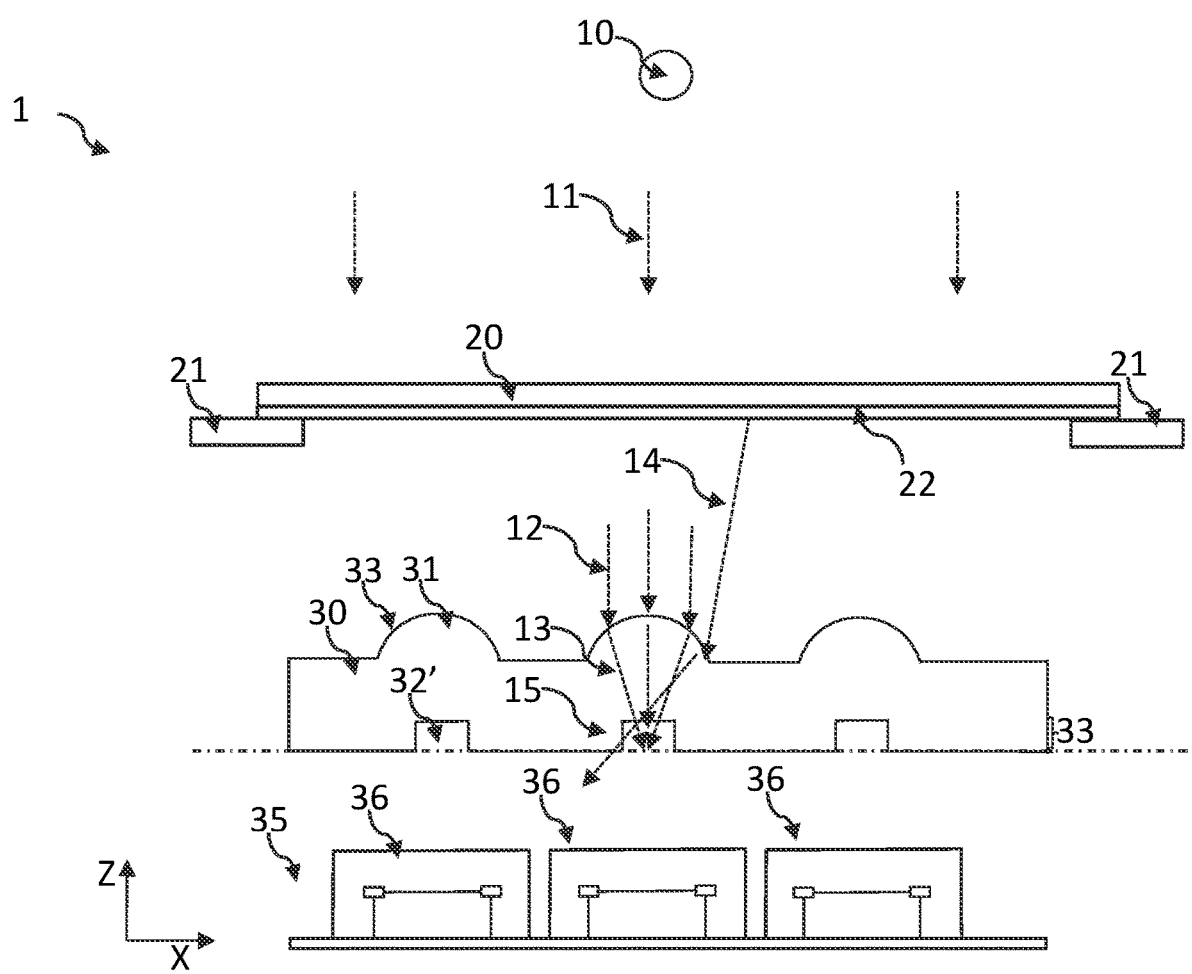
FIG. 5 shows a fifth embodiment of the invention.

FIG. 5 represents a variant of the embodiment described in association with FIG. 4. According to this embodiment, each phase-shifting element 32' is obtained by removal of material from the bottom face 33$_i$ of the support plate 33. The index of each phase-shifting element is therefore the index of the outside medium, for example air. In this case, the thickness t of an element 32', on the axis of propagation Z, is such that:

$$t = \frac{\lambda}{4(n - n_{ext})} \text{ with } n > n_{ext}, \qquad (7)$$

in which n is the refractive index of the support plate 33.

Although described in association with a light source emitting in the infrared spectral domain, the invention can be implemented in the visible or UV spectral domain.

Generally, each phase-shifting element 32' is formed by the addition of a first material on a support layer (33) formed by a second material (see FIG. 4, the first material being Si, which is also the second material), or by inclusion of a first material in the support layer (see FIG. 5, the first material being air).

The invention will be able to be implemented for the observation of samples that are essentially transparent, including transparent particles or particles that can be considered as such. It can be applicable in the field of biological samples, but also as well as in other industrial areas, for example the checking of samples in the environment or in the agri-food industry. It applies equally to liquid and solid samples.

The invention claimed is:

1. A device for observing a sample, comprising
    a light source, configured to emit a light wave in a direction of propagation, according to an emission wavelength;
    an image sensor, comprising several pixels;
    a plurality of convergent microlenses, each microlens being disposed facing a pixel, each microlens comprising an image focus, each microlens being configured to form, from light waves from the light source, being propagated parallel to the direction of propagation, a light wave beam converging towards the image focus of said microlens;
    the device being configured to hold the sample between the light source and microlenses forming a matrix;
    wherein
    the device comprises several attenuating elements, each attenuating element being associated with a microlens and with a pixel, each attenuating element being configured to attenuate the light waves converging towards the image focus of the lens with which it is associated;
    each attenuating element is:
        either a mask that is opaque to the emission wavelength;
        or a phase-shifting element, formed from a transparent material arranged to induce a phase-shift, the phase-shift being determined with respect to a light wave being propagated in the absence of the attenuating element;
    each attenuating element extends between the microlens and the pixel with which it is associated;
    such that each attenuating element attenuates each light wave being propagated to or from the image focus of a microlens.

2. The device according to claim 1, wherein
    the pixels are coplanar, and distributed according to a detection plane;
    the respective image focuses of each microlens are coplanar, and form a focal plane, parallel to the detection plane;
    the attenuating elements extend in the focal plane or in a plane parallel to the focal plane.

3. The device according to claim 2, wherein the attenuating elements extend in a plane parallel to the focal plane, said parallel plane being disposed at a distance less than 1 mm from the focal plane.

4. The device according to claim 1, wherein
    the pixels are coplanar, and distributed according to a detection plane;
    each attenuating element extends parallel to the detection plane, with a diagonal or a greater diameter less than two times the emission wavelength.

5. The device according to claim 1, wherein each attenuating element is a mask that is opaque to the emission wavelength.

6. The device according to claim 1, wherein
each attenuating element is a phase-shifting element;
the phase-shift created by each phase-shifting element is a quarter of the emission wavelength, or an odd multiple of the quarter of the emission wavelength.

7. The device according to claim 1, wherein
each attenuating element is a phase-shifting element;
each attenuating element is formed by an inclusion of a first material in or on a support formed by a second material.

8. The device according to claim 1, wherein each attenuating element is secured to a support layer, the support layer being secured to the plurality of microlenses or disposed at a distance from the plurality of microlenses.

9. The device according to claim 1, wherein each attenuating element is secured to the image sensor.

10. The device according to claim 1, wherein the emission wavelength lies between 800 nm and 15 µm.

11. The device according to claim 1, wherein:
the distance between the sample and the plurality of microlenses is less than 1 mm or than 500 µm;
and/or the distance between the plurality of microlenses and the image sensor is less than 1 mm or than 500 µm;
and/or the distance between the sample and the image sensor is less than 1 mm.

\* \* \* \* \*